United States Patent
Cakulev et al.

(10) Patent No.: US 11,937,171 B2
(45) Date of Patent: *Mar. 19, 2024

(54) SYSTEMS AND METHODS FOR ENABLING OPTIMIZED REPORTING RELATED TO POLICY CONTROL REQUEST TRIGGERS

(71) Applicant: Verizon Patent and Licensing Inc., Basking Ridge, NJ (US)

(72) Inventors: Violeta Cakulev, Milburn, NJ (US); Sudhakar Reddy Patil, Flower Mound, TX (US); Lalit R. Kotecha, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/173,197

(22) Filed: Feb. 23, 2023

(65) Prior Publication Data

US 2023/0199621 A1 Jun. 22, 2023

Related U.S. Application Data

(63) Continuation of application No. 17/216,321, filed on Mar. 29, 2021, now Pat. No. 11,601,866.

(51) Int. Cl.
*H04W 48/04* (2009.01)
*H04W 4/029* (2018.01)
(Continued)

(52) U.S. Cl.
CPC ........... *H04W 48/04* (2013.01); *H04W 4/029* (2018.02); *H04W 4/50* (2018.02); *H04W 48/16* (2013.01)

(58) Field of Classification Search
CPC ............... H04W 4/24; H04M 15/8038; H04M 15/8228; H04M 15/8016
(Continued)

(56) References Cited

U.S. PATENT DOCUMENTS 11,601,866 B2 * 3/2023 Cakulev ............ H04M 15/8016
2014/0321271 A1 10/2014 Bonnier et al.
(Continued)

FOREIGN PATENT DOCUMENTS

CN 115362715 A * 11/2022 ............ H04W 36/06
EP 3806537 A1 * 4/2021 ......... H04L 12/1407
(Continued)

OTHER PUBLICATIONS

W. S. Ooms, F. A. Walraven and M. R. van der Werff, "Integration of IMS and DVB-RCS for Interactive Content Delivery," 2009 IEEE International Conference on Communications, Dresden, Germany, 2009, pp. 1-6, doi: 10.1109/ICC.2009.5199086. (Year: 2009).*
(Continued)

*Primary Examiner* — William D Cumming

(57) ABSTRACT

A first network device may receive, from a second network device, a first policy control create request and may provide, to the second network device, a common policy control request trigger. The first network device may receive a second policy control create request associated with a user equipment (UE) and may cause a UE policy to be provided to the UE. The first network device may receive, from a third network device, a third policy control create request and may provide a network device policy to the third network device. The first network device may receive, from the second network device, a policy control update request based on the common policy control request trigger and may generate an updated UE policy or an updated network device policy based on the policy control update request.

20 Claims, 7 Drawing Sheets

(51) Int. Cl.
*H04W 4/50* (2018.01)
*H04W 48/16* (2009.01)

(58) Field of Classification Search
USPC .................................................. 370/29, 329
See application file for complete search history.

(56) References Cited

U.S. PATENT DOCUMENTS

| | | |
|---|---|---|
| 2020/0221541 A1 | 7/2020 | Yan |
| 2021/0029590 A1 | 1/2021 | Ying et al. |
| 2021/0084173 A1* | 3/2021 | Sun .................... H04M 15/8038 |
| 2021/0212136 A1 | 7/2021 | Lee et al. |
| 2022/0312297 A1* | 9/2022 | Cakulev ............. H04M 15/8228 |
| 2023/0199621 A1* | 6/2023 | Cakulev .................. H04W 4/24 370/329 |

FOREIGN PATENT DOCUMENTS

| | | | |
|---|---|---|---|
| WO | 2012/102827 | 8/2012 | |
| WO | 2019/228434 | 12/2019 | |
| WO | WO-2019228434 A1 * | 12/2019 | ......... H04L 12/1407 |
| WO | WO-2021191712 A1 * | 9/2021 | ............ H04L 67/51 |
| WO | 2021/204369 | 10/2021 | |

OTHER PUBLICATIONS

Li, et al., "Dynamic policy and charging control framework", in Bell Labs Technical Journal, vol. 17, No. 1, pp. 105-123, Jun. 2012, doi: 10.1002/bltj.21526. (Year: 2012).

Zhuang, et al., "Policy-Based QoS Architecture in the IP Multimedia Subsystem of UMTS", Zhuang, et al., "Policy-Based QoS Architecture in the IP Multimedia Subsystem of UMTS", IEEE Network, vol. 17, Issue 3, pp. 51-57, May-Jun. 2003.

* cited by examiner

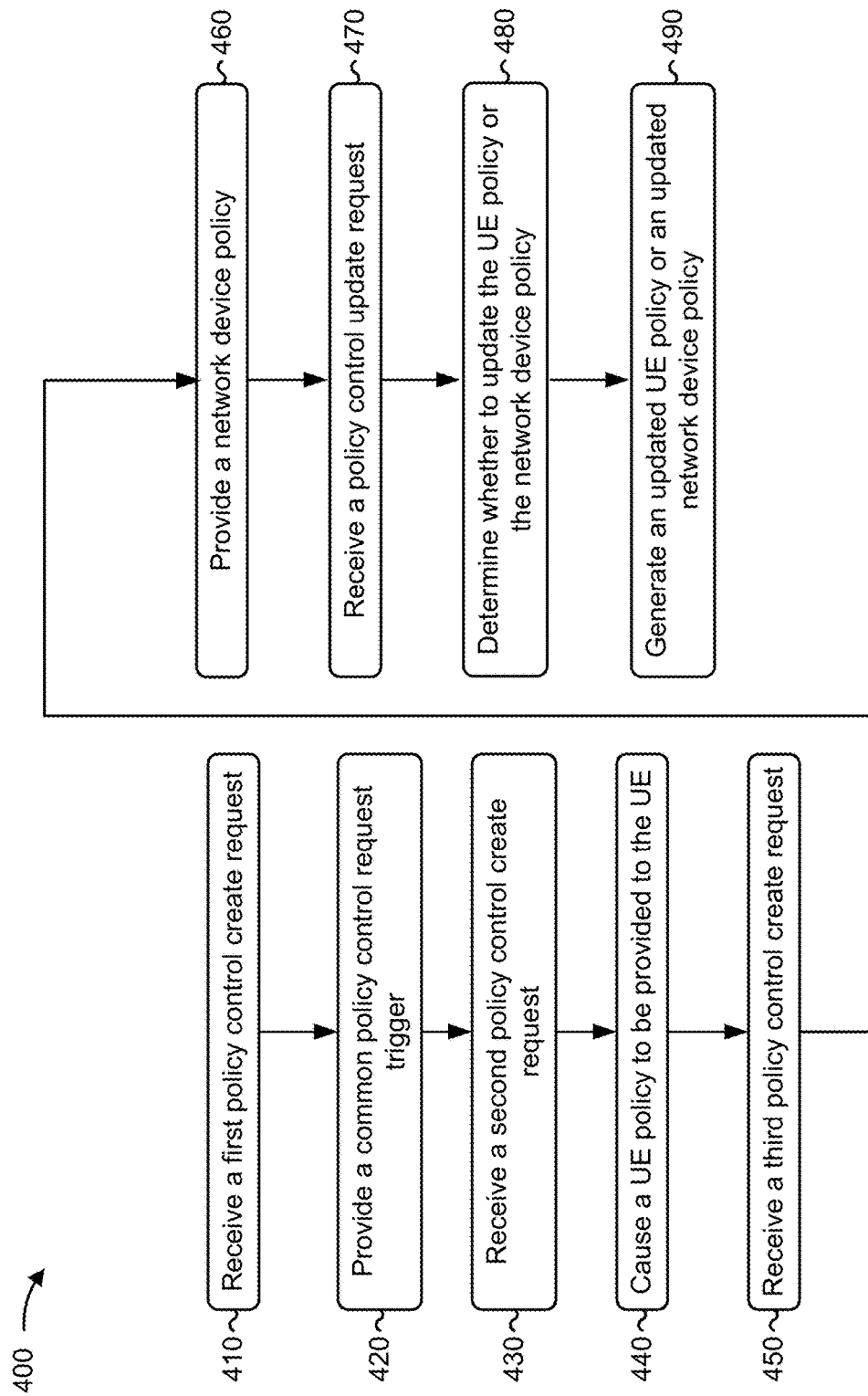

SYSTEMS AND METHODS FOR ENABLING OPTIMIZED REPORTING RELATED TO POLICY CONTROL REQUEST TRIGGERS

RELATED APPLICATION

This application is a continuation of U.S. patent application Ser. No. 17/216,321, entitled "SYSTEMS AND METHODS FOR ENABLING OPTIMIZED REPORTING RELATED TO POLICY CONTROL REQUEST TRIGGERS," filed Mar. 29, 2021 (now U.S. Pat. No. 11,601,866), which is incorporated herein by reference in its entirety.

BACKGROUND

A policy control function (PCF) may provide protocol data unit (PDU) session management policy control to a session management function (SMF), access and mobility related policy control information to an access and mobility management function (AMF), and a user equipment (UE) access selection and PDU session related policies to a UE.

BRIEF DESCRIPTION OF THE DRAWINGS

FIG. 4 is a flowchart of an example process for enabling optimized reporting related to policy control request triggers.

DETAILED DESCRIPTION OF PREFERRED EMBODIMENTS

Figure 1A:
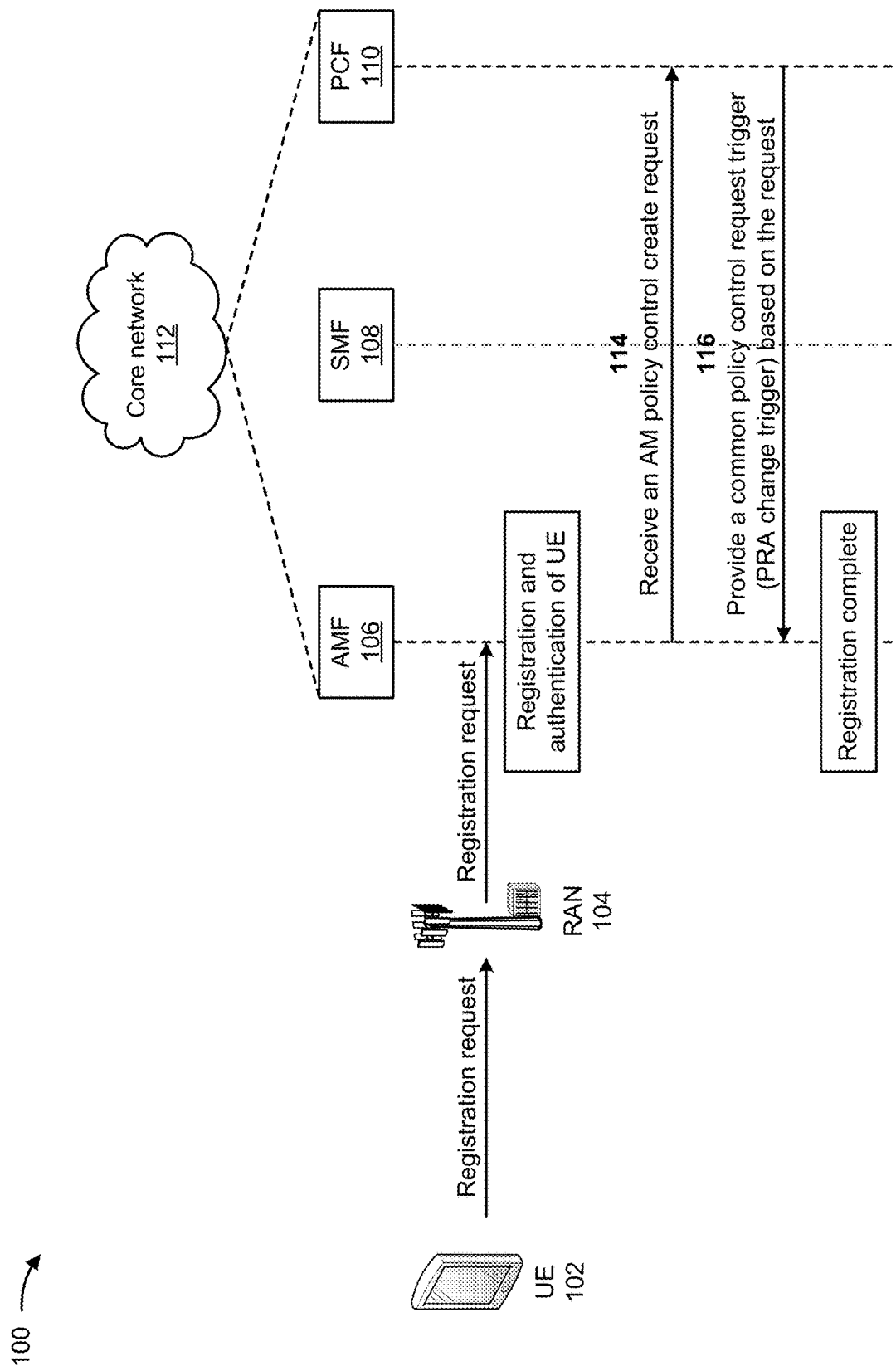
FIGS. 1A-1D are diagrams of an example associated with enabling optimized reporting related to policy control request triggers.

The following detailed description of example implementations refers to the accompanying drawings. The same reference numbers in different drawings may identify the same or similar elements.

A policy control function (PCF) uses session management (SM) policies to control quality of service (QoS) and charging characteristics of subscriber data sessions. The PCF uses access and mobility (AM) policies to control service area restrictions (e.g., a list of allowed tracking area identities (TAIs), non-allowed TAIs, among other examples) and to specify a radio access technology (RAT)/frequency selection priority (RFSP) index that defines spectrum permissions that apply to a UE. The PCF uses user equipment (UE) policies to control access network discovery and selection policy information (e.g., wireless local area network (WLAN) selection information, non-3rd Generation Partnership Project (3GPP) interworking function (N3IWF) selection information, evolved packet data gateway (ePDG) selection information, among other examples), and UE route selection policy (URSP) information (e.g., association of an application with a PDU session, slice selection, among other examples).

The PCF may provide, to a session management function (SMF), a set of policy control request triggers as part of an SM policy association establishment (e.g., as part of the PCF determining and providing the SM policies to the SMF). The PCF may provide the policy control request triggers and the SM policies via an SM policy control service. The PCF may provide, to an access and mobility management function (AMF), a set of policy control request triggers as part of an AM policy association establishment (e.g., as part of the PCF determining and providing the AM policies to the AMF). The PCF may provide the policy control request triggers and the AM policies via an AM policy control service. The PCF may provide, to the AMF, a set of policy control request triggers as part of a UE policy association establishment (e.g., as part of the PCF determining and providing the UE policies to the AMF). The PCF may provide the policy control request triggers and the UE policies via a UE policy control service.

A policy control request trigger may include information that identifies a condition that causes the AMF or the SMF to communicate with the PCF (e.g., after a policy association establishment) to cause the PCF to provide an updated policy. The PCF may provide the policy control request trigger to cause the AMF and the SMF to notify the PCF when the condition (associated with the policy control request trigger) has been satisfied. As an example, the AMF may detect that the condition (associated with the policy control request trigger) has been satisfied and may report, to the PCF, that the condition has been satisfied. Based on the AMF reporting that the condition has been satisfied, the PCF may update the AM policies and provide the updated AM policies to the AMF.

In some instances, the PCF may provide a same policy control request trigger (e.g., a presence reporting area (PRA) change associated with the UE or a location change associated with the UE) via the AMF policy control service, the UE policy control service, and the SMF policy control service. As a result of providing the same policy control request trigger, the SMF may provide a request, to the AMF, to be notified when a condition (associated with the same policy control request trigger) has been satisfied (e.g., when the UE enters and/or leaves the PRA or when the location of the UE has changed). When the AMF determines that the condition has been satisfied, the AMF may report, to the PCF, that the condition has been satisfied to cause the PCF to provide an updated AM policy and to cause the PCF to provide an updated UE policy.

Additionally, the AMF may report, to the SMF, that the condition has been satisfied (based on the request of the SMF to be notified when the condition is satisfied). Based on the report by the AMF, the SMF may report, to the PCF, that the condition has been satisfied to cause the PCF to provide an updated SM policy. Each report (e.g., by the AMF and the SMF) may include the same information indicating that the condition has been satisfied (e.g., information indicating the PRA change). Thus, current techniques for handling policy control request triggers consume computing resources (e.g., processing resources, memory resources, communication resources, among other examples), networking resources, among other examples associated with generating unnecessary network traffic based on the PCF providing a same policy control request trigger to the AMF and the SMF, generating unnecessary network traffic based on the AMF reporting to the SMF that a condition (associated with the same policy control request trigger) has been satisfied, generating unnecessary network traffic based on the AMF and the SMF reporting (to the PCF) the same information indicating that the condition has been satisfied, among other examples.

Some implementations described herein include a first network device (e.g., a PCF) that enables optimized reporting related to policy control request triggers. For example, the first network device may receive, from a second network device (e.g., an AMF), a first policy control create request and may provide, to the second network device, a common policy control request trigger based on the first policy control create request. The common policy control request trigger may include a policy control request trigger that is provided to the AMF and to an SMF (e.g., a policy control request trigger that is common with respect to the AMF and the SMF). The common policy control request trigger may include information regarding a PRA change associated with a UE, information regarding a location change associated with the UE, among other examples. The first network device may also provide, to the second network device, an AM policy based on the first policy control create request.

The first network device may receive a second policy control create request associated with the UE. Based on the second policy control create request, the first network device may cause a UE policy to be provided to the UE without providing the common policy control request trigger. The first network device may receive, from a third network device (e.g., an SMF), a third policy control create request. Based on the third policy control create request, the first network device may provide a network device policy (e.g., an SM policy) to the third network device without providing the common policy control request trigger.

The first network device may receive, from the second network device, a policy control update request based on the common policy control request trigger. For example, the second network device may determine a PRA change (e.g., determine that the UE has entered the PRA or has left the PRA) and may provide the policy control update request to report that the PRA change. Based on receiving the policy control update request, the first network device may update the AM policy. Additionally, based on receiving the policy control update request, the first network device may determine whether to update the UE policy and/or the network device policy. The first network device may generate an updated UE policy and/or an updated network device policy based on determining whether to update the UE policy and/or the network device policy.

By providing the common policy control request trigger as described herein, the first network device enables optimized reporting related to policy control request triggers. The first network device may improve reporting related to a common policy control request trigger by eliminating the need of the multiple network devices reporting that the condition (associated with the common policy control request trigger) has been satisfied. Thus, the first network device conserves computing resources, networking resources, and/or other resources that would have otherwise been consumed by generating unnecessary network traffic based on the first network device providing a same policy control request trigger to the second network device and the third network device, consumed by generating unnecessary network traffic based on the second network device reporting to the third network device that a condition (associated with the same policy control request trigger) has been satisfied, consumed by generating unnecessary network traffic based on the second network device and the third network device providing (to the first network device) the same information indicating that the condition has been satisfied, among other examples.

FIGS. 1A-1D are diagrams of an example 100 associated with enabling optimized reporting of policy control request triggers. As shown in FIGS. 1A-1D, example 100 includes a UE 102 associated with a radio access network (RAN) 104 and a core network 112 that includes an AMF 106, an SMF 108, and a PCF 110. UE 102, RAN 104, AMF 106, SMF 108, PCF 110, and core network 112 are described in greater detail below with respect to FIGS. 2 and 3.

As shown in FIG. 1A, UE 102 may provide a registration request to RAN 104. UE 102 may provide the registration request to register with core network 112 and/or to receive services provided by core network 112. In some implementations, the registration request includes an initial registration request message. For example, UE 102 may send an initial registration request message to AMF 106 via RAN 104 when UE 102 first connects to RAN 104. The initial registration request may include information that identifies UE 102 (e.g., a mobile device number (MDN), an international mobile equipment identity (IMEI), a temporary mobile subscriber identity (TMSI), a subscription permanent identifier (SUPI), among other examples), information identifying a user of UE 102, information that indicates one or more capabilities of UE 102 (e.g., one or more communication capabilities of UE 102), information that indicates one or more characteristics associated with UE 102 (e.g., a location of UE 102, a time zone associated with UE 102, a movement of UE 102, among other examples), authentication information associated with UE 102, among other examples.

As further shown in FIG. 1A, RAN 104 may provide the registration request and the authentication information associated with UE 102 to AMF 106. In some implementations, AMF 106 may authenticate UE 102 based on the authentication information.

PCF 110 may include a session management policy control function (SM PCF), an access and mobility related policy control function (AM PCF), and a UE policy control function (UE PCF). The SM PCF may utilize session management policies to control a quality of service (QoS), charging characteristics, among other examples associated with PDU sessions. The AM PCF may utilize access and mobility policies to control service area restrictions, to control AM PCF services (e.g., access to a high-speed millimeter wave spectrum during an off-peak time period, on-demand access to the high-speed millimeter wave spectrum, a limited duration access to the high-speed millimeter wave spectrum, among other examples), and/or to specify a Radio Access Technology/Frequency Selection Priority (RFSP) index that defines the spectrum permissions that apply to a UE 102. The UE PCF may utilize UE policies to control access network discovery and selection policy information (e.g., WLAN selection information, Non-3GPP Interworking Function (N3IWF) selection information, Evolved Packet Data Gateway (ePDG) selection information, among other examples), UE Route Selection Policy (URSP) information (e.g., association of an application with a PDU session, a slice selection, among other examples), and/or UE PCF services (e.g., access to a mobile edge cloud offload site during an off-peak time period, on-demand access to the mobile edge cloud offload site, a limited duration access to the mobile edge cloud offload site, among other examples).

As shown in FIG. 1A, and by reference number 114, PCF 110 may receive an AM policy control create request. For example, PCF 110 may receive the AM policy control request from AMF 106. In some examples, as part of registering and authenticating UE 102, AMF 106 may provide the AM policy control create request to cause PCF 110 to create (or determine) an AM policy associated with UE 102. The AM policy control request may include the information that identifies UE 102, the information that indicates the one or more characteristics associated with UE 102, information identifying service area restrictions obtained from a unified data management (UDM) device (e.g., associated with core network 112), an RFSP index obtained from the UDM device, among other examples.

In some implementations, PCF 110 may comprise a single device. For example, the SM PCF, the AM PCF, and the UE PCF may be included in the same network device. In such implementations, AMF 106 may provide the AM policy control request to the single device. In some implementations, PCF 110 may comprise multiple devices. For example, the SM PCF may be included in a first device, the AM PCF may be included in a second device, and the UE PCF may be included in the first device, the second device, or a third device. In such implementations, AMF 106 may provide the AM policy control request to the PCF that handles AM policy control service (e.g., the AM PCF).

As shown in FIG. 1A, and by reference number 116, PCF 110 may provide a common policy control request trigger (PRA change trigger) based on the AM policy control create request. For example, PCF 110 may create (or determine) the AM policy based on the AM policy control request (e.g., based on information included in the AM policy control request). The AM policy may include a policy relating to the service area restrictions, relating to the RFSP index, among other examples.

In addition to creating (or determining) the AM policy, PCF 110 may create (or determine) a common policy control trigger based on the AM policy control request. The common policy control request trigger may include a policy control request trigger that is typically provided to the AMF via an AM policy control service and via a UE policy control service and provided to the SMF via an SM policy control service. In other words, the common policy control request trigger may include a policy control request trigger that is common with respect to the AMF and to the SMF. In some examples, the common policy control request trigger may include information regarding a presence reporting area (PRA) change associated with UE 102 (e.g., a change of a presence of UE 102 in the PRA). Alternatively, the common policy control request trigger may include a location change associated with UE 102 (e.g., a change of a tracking area associated with UE 102). The PRA may include an area associated with one or more neighbor cells of a serving cell of UE 102.

As shown in FIG. 1A, assume that the common policy control request trigger includes the information regarding the PRA change associated with UE 102. In this regard, the common policy control request trigger may include information identifying UE 102, information identifying the PRA, and information indicating that PCF 110 is to be notified when a condition associated with the common policy control request trigger is satisfied (e.g., notified when a presence of UE 102 in the PRA changes based on UE 102 entering or leaving the PRA). PCF 110 may provide the AM policy and the common policy control request trigger to AMF 106. In some examples, PCF 110 may provide the AM policy and the common policy control request trigger via an AM policy control service.

In some implementations, PCF 110 may be configured (e.g., by an administrator of core network 112) to provide the common policy control request trigger once (e.g., via a single policy control service) instead of providing the common policy control request trigger multiple times (e.g., via the AM policy control service, via a UE policy control service, and via an SM policy control service). By providing the common policy control request trigger in this manner, PCF 110 conserves computing resources, networking resources, and/or other resources that would have otherwise been consumed by generating unnecessary network traffic based on PCF 110 providing the policy control request trigger multiple times to AMF 106 and SMF 108 (e.g., via the AM policy control service, via a UE policy control service, and via an SM policy control service), consumed by generating unnecessary network traffic based on AMF 106 reporting to SMF 108 that the condition (associated with the policy control request trigger) has been satisfied, consumed by generating unnecessary network traffic based on AMF 106 and SMF 108 providing (to PCF 110) the same information indicating that the condition has been satisfied, among other examples.

Figure 1B:
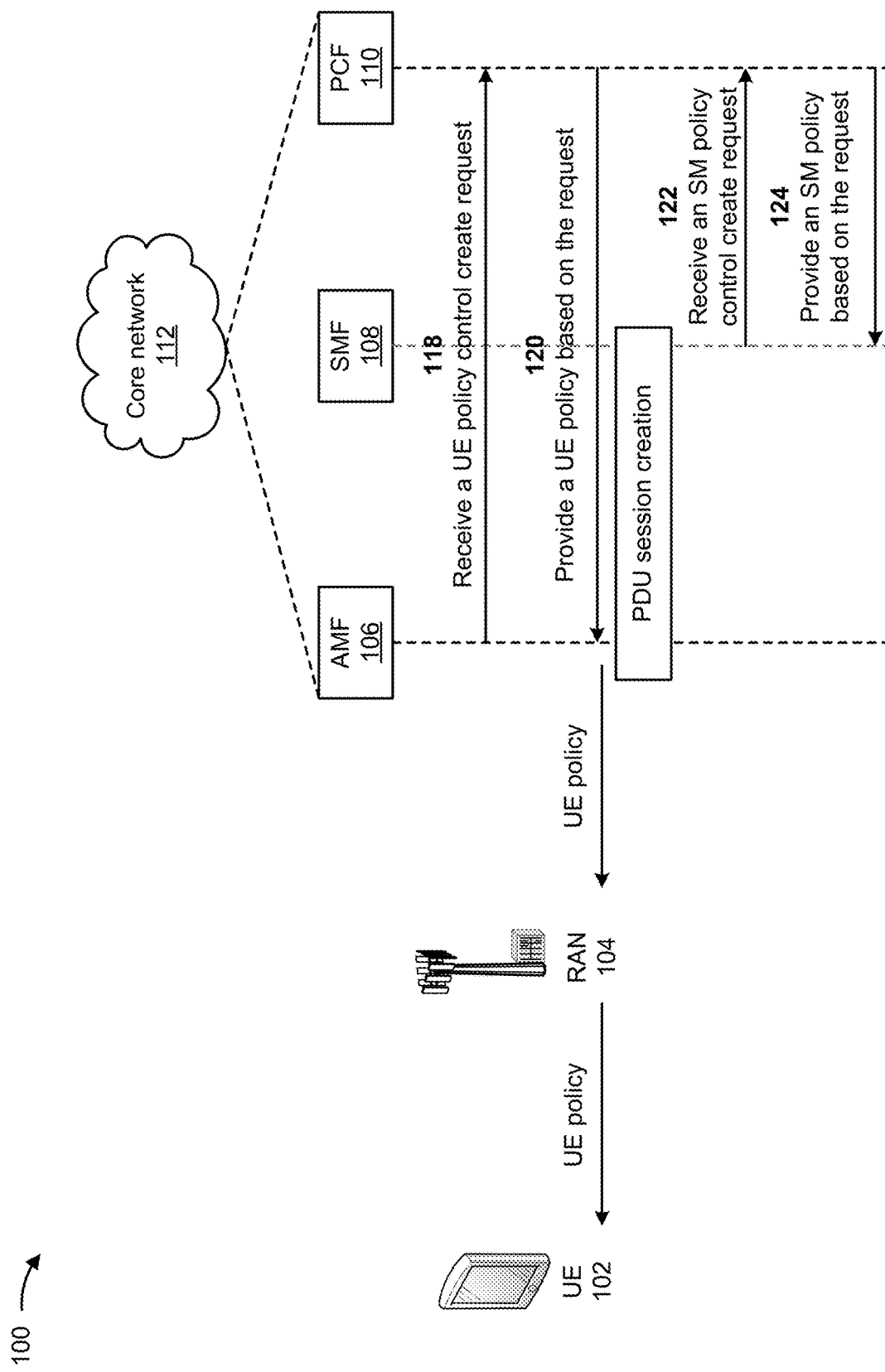

As shown in FIG. 1B, and by reference number 118, PCF 110 may receive a UE policy control create request. For example, PCF 110 may receive the UE policy control request from AMF 106. In some examples, as part of registering and authenticating UE 102, AMF 106 may transmit the UE policy control create request to cause PCF 110 to create (or determine) a UE policy associated with UE 102. The UE policy control create request may include the information that identifies UE 102, the information that indicates the one or more characteristics associated with UE 102, among other examples.

In some implementations, AMF 106 may provide the UE policy control request to the single device, as explained above. Alternatively, AMF 106 may provide the AM policy control request to the PCF that handles UE policy control service (e.g., the UE PCF).

As shown in FIG. 1B, and by reference number 120, PCF 110 may provide the UE policy based on the request. For example, PCF 110 may create (or determine) the UE policy based on the UE policy control request (e.g., based on information included in the UE policy control request). The UE policy may include a policy relating to control access network discovery and selection policy information, relating to URSP information (e.g., association of an application with a PDU session, slice selection, among other examples), and/or relating to UE PCF services (e.g., access to a mobile edge cloud offload site during an off-peak time period, on-demand access to the mobile edge cloud offload site, a limited duration access to the mobile edge cloud offload site, among other examples).

PCF 110 may provide the UE policy to UE 102 via AMF 106 (e.g., without providing the common policy control request trigger). In some implementations, PCF 110 may determine that the common policy control request trigger has been provided (e.g., provided to AMF 106 via the AM policy control service). Accordingly, PCF 110 may provide the UE policy to AMF 106 without providing the common policy control request trigger a second time. PCF 110 may provide the UE policy to AMF 106 to cause AMF 106 to provide the UE policy to UE 102 via RAN 104. In some examples, PCF 110 may provide the UE policy via a UE policy control service. By providing the UE policy without providing the common policy control request trigger, PCF 110 conserves computing resources, networking resources, and/or other resources that would have otherwise been consumed by generating unnecessary network traffic based on PCF 110 providing the policy control request trigger to AMF 106 and SMF 108, consumed by generating unnecessary network traffic based on AMF 106 reporting to SMF 108 that a condition (associated with the policy control request trigger) has been satisfied, consumed by generating unnecessary network traffic based on AMF 106 and SMF 108 providing (to PCF 110) the same information indicating that the condition has been satisfied, among other examples.

As shown in FIG. 1B, and by reference number 122, PCF 110 may receive an SM policy control create request. For example, PCF 110 may receive the SM policy control request from SMF 108. In some examples, as part of creating a PDU session associated with UE 102, SMF 108 may provide the SM policy control create request to cause PCF 110 to create (or determine) an SM policy associated with UE 102. In some instances, SMF 108 may provide the SM policy control create request based on receiving a session request (from UE 102) to establish the PDU session.

The SM policy control create request may include the information that identifies UE 102, the information that indicates the one or more characteristics associated with UE 102, information identifying the PDU session, a network address associated with the UE, information identifying core network 112, information regarding a QoS associated with the PDU session, information regarding charging characteristics associated with the PDU session, among other examples. The session request may include the information that identifies UE 102, the information that indicates the one or more characteristics associated with UE 102, information that identifies a preferred network of UE 102, information that identifies the network address associated with of UE 102, information that identifies a session management capability of UE 102, among other examples.

In some implementations, SMF 108 may provide the SM policy control request to the single device, as explained above. Alternatively, SMF 108 may provide the SM policy control request to the PCF that handles SM policy control service (e.g., the SM PCF).

As shown in FIG. 1B, and by reference number 124, PCF 110 may provide the SM policy based on the SM policy control create request. For example, PCF 110 may create (or determine) the SM policy based on the SM policy control request (e.g., based on information included in the SM policy control request). The SM policy may include a policy relating to the information identifying the PDU session, relating to the network address associated with the UE, relating to the information identifying core network 112, relating to the information regarding the QoS associated with the PDU session, relating the charging characteristics associated with the PDU session, among other examples.

PCF 110 may provide the SM policy to SMF 108 (e.g., without providing the common policy control request trigger). In some implementations, PCF 110 may determine that the common policy control request trigger has been provided (e.g., has been provided to AMF 106 via the AM policy control service). Accordingly, PCF 110 may provide the SM policy to SMF 108 without providing the common policy control request trigger a second time. PCF 110 may provide the SM policy to AMF 106 to cause AMF 106 to provide the SM policy to UE 102. In some examples, PCF 110 may provide the SM policy via an SM policy control service.

By providing the SM policy without providing the common policy control request trigger, PCF 110 conserves computing resources, networking resources, and/or other resources that would have otherwise been consumed by generating unnecessary network traffic based on PCF 110 providing the policy control request trigger to AMF 106 and SMF 108, generating unnecessary network traffic based on AMF 106 reporting to SMF 108 that a condition (associated with the policy control request trigger) has been satisfied, generating unnecessary network traffic based on AMF 106 and SMF 108 providing (to PCF 110) the same information indicating that the condition has been satisfied, among other examples.

Figure 1C:
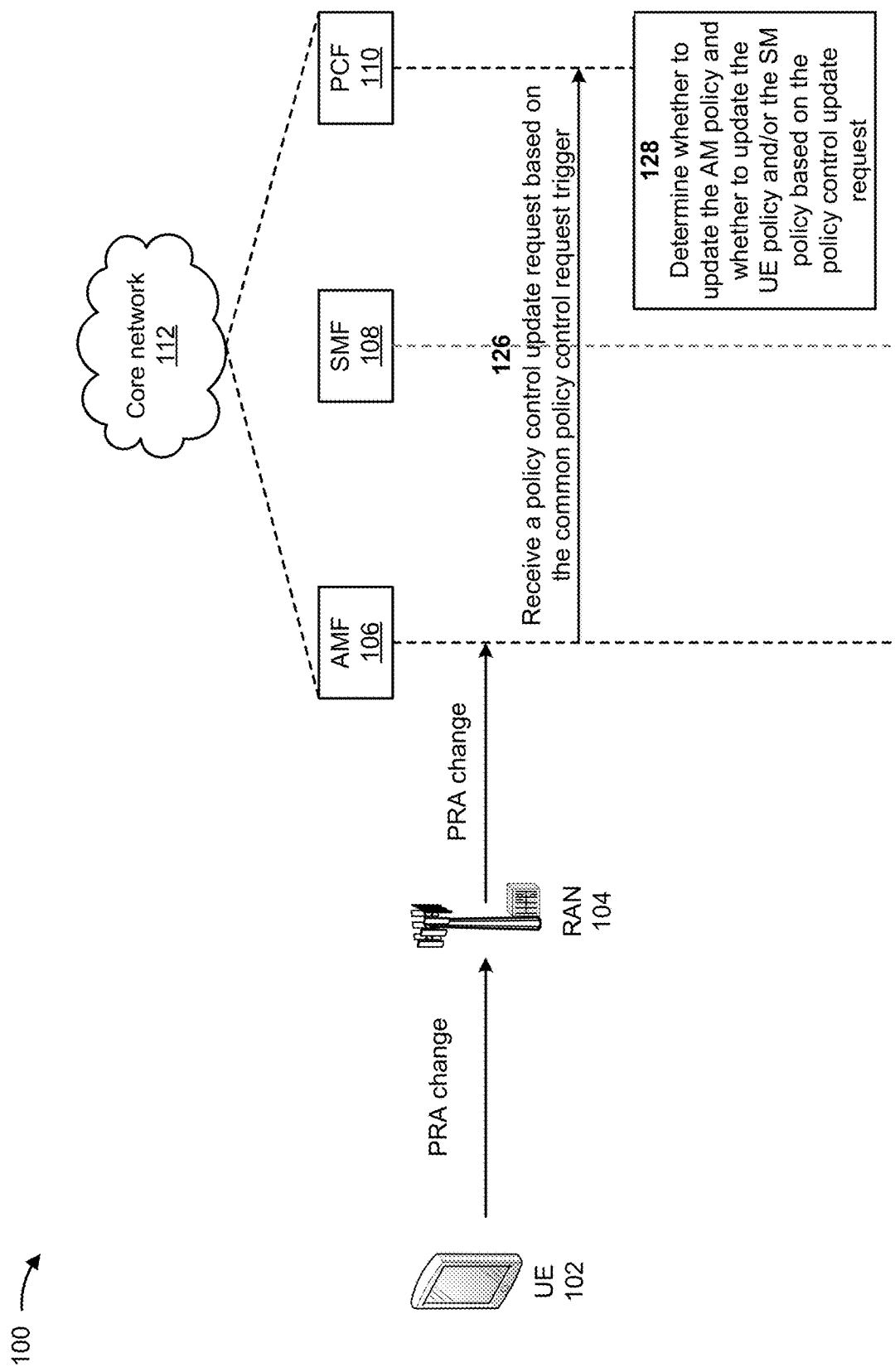

As shown in FIG. 1C, assume that a movement of UE 102 (e.g., from a current location to a new location) has caused a PRA change. For example, assume that UE 102 has entered the PRA or has left the PRA based on the movement of UE 102. Further assume that UE 102 reports the new location to RAN 104 (e.g., UE 102 provides information identifying the new location) and that RAN 104 reports the new location to AMF 106 (e.g., RAN 104 provides the information identifying the new location to AMF 106). In some implementations, based on RAN 104 reporting the new location to AMF 106, AMF 106 may determine that the new location is an indication of the PRA change associated with UE 102. For example, AMF 106 may use the information identifying the new location to determine the PRA change associated with UE 102.

As show in FIG. 1C, and by reference 126, PCF 110 may receive a policy control update request based on the common policy control request trigger. In some implementations, based on determining the PRA change and based on the policy control request trigger provided by PCF 110 (e.g., prior to receiving the indication of the PRA change), AMF 106 may determine that the condition (associated with the common policy control request trigger) has been satisfied. Accordingly, AMF 106 may determine that the PRA change is to be reported to PCF 110 (e.g., in accordance with the policy control request trigger). AMF 106 may generate and provide a policy control update request.

The policy control update request may include information identifying UE 102, information identifying the new location of UE 102, information included in the common policy control request trigger, information indicating that the condition (associated with the common policy control request trigger) has been satisfied (e.g., information indicating the PRA change), information requesting an update to the AM policy based on the condition being satisfied, among other examples. In some implementations, AMF 106 may provide the policy control update request to cause PCF 110 to determine whether to update the AM policy based on the PRA change. In some implementations, AMF 106 may provide the policy control update request to the single device, as explained above. Alternatively, AMF 106 may provide the policy control update request to the PCF that handles AM policy control service, as explained above.

As show in FIG. 1C, and by reference number 128, PCF 110 may determine whether to update the AM policy and whether to update the UE policy and/or the SM policy based on the policy control update request. In some implementations, PCF 110 may determine that the AM policy is to be updated and determine whether to update the UE policy and/or the SM policy, based on the policy control update request (e.g., based on information included in the policy control update request). For example, PCF 110 may determine to update the AM policy based on the information identifying the new location of UE 102. For instance, PCF 110 may determine that the service area restrictions are to be updated based on the new location, determine that the RFSP index is to be updated based on the new location, among other examples.

In some implementations, PCF 110 may determine whether to update the UE policy based on the new location. For example, PCF 110 may determine whether to update the control access network discovery and selection policy information based on the new location, whether to update the URSP information based on the new location, and/or whether to update the UE PCF services based on the new location.

Additionally, or alternatively, to determining whether to update the UE policy, PCF 110 may determine whether to update the SM policy based on the new location. For example, PCF 110 may determine whether to update the information regarding the QoS associated with the PDU session (e.g., update the QoS) based on the new location, determine whether to update the charging characteristics associated with the PDU session based on the new location, among other examples.

Figure 1D:
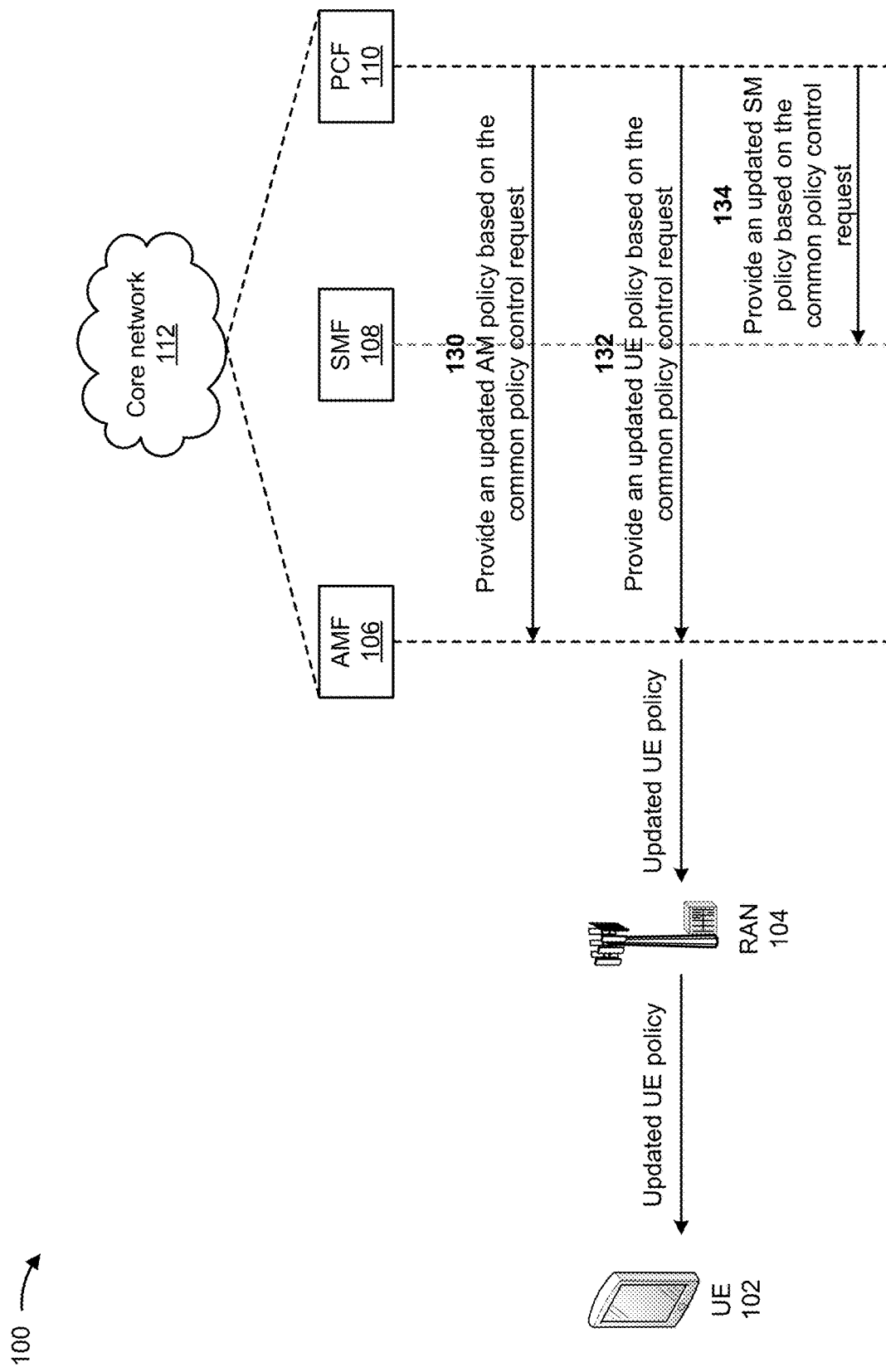

As show in FIG. 1D, and by reference number 130, PCF 110 may provide an updated AM policy based on the common policy control request. For example, PCF 110 may update the AM policy (e.g., to include a policy relating to the updated service area restrictions, relating to the updated RSPI index, among other examples). PCF 110 may provide the updated AM policy to AMF 106 in a manner similar to the manner described above in connection with FIG. 1A.

As show in FIG. 1D, and by reference number 132, PCF 110 may provide an updated UE policy based on the common policy control request. For example, assume that PCF 110 determines to update the UE policy in a manner similar to the manner described above. For instance, assume that, based on the new location, PCF 110 updates the control access network discovery and selection policy information, the URSP information, and/or the UE PCF services. PCF 110 may provide the updated UE policy (e.g., including an updated policy relating to the updated control access network discovery and selection policy information, relating to the updated URSP information, and/or relating to the updated UE PCF services) to AMF 106 in a manner similar to the manner described above in connection with FIG. 1B. PCF 110 may provide the updated UE policy to cause AMF 106 to provide the updated UE policy to UE 102 via RAN 104.

As show in FIG. 1D, and by reference number 134, PCF 110 may provide an updated SM policy based on the common policy control request. For example, assume that PCF 110 determines to update the SM policy in a manner similar to the manner described above. For instance, assume that, based on the new location, PCF 110 updates the information regarding the QoS associated with the PDU session (e.g., updates the QoS) and/or updates the charging characteristics associated with the PDU session. PCF 110 may provide the updated SM policy (e.g., including an updated policy relating to the updated QoS and/or relating to the updated charging characteristics) to SMF 108, in a manner similar to the manner described above in connection with FIG. 1B.

By providing the common policy control request trigger as described herein, PCF 110 enables optimized reporting related to policy control request triggers. PCF 110 may improve reporting related to a common policy control request trigger by preventing multiple network devices from reporting that a condition (associated with the common policy control request trigger) has been satisfied. When the policy control update request is provided to PCF 110 by AMF 106, PCF 110 may evaluate the AM policy (e.g., to determine whether the AM policy is to be updated) and evaluate other policies (e.g., the UE policy and/or the SM policy) to which the policy control update request may be relevant. Thus, PCF 110 conserves computing resources, networking resources, and/or other resources that would have otherwise been consumed by generating unnecessary network traffic based on PCF 110 providing a same policy control request trigger to AMF 106 and SMF 108, consumed by generating unnecessary network traffic based on AMF 106 reporting to SMF 108 that a condition (associated with the same policy control request trigger) has been satisfied, consumed by generating unnecessary network traffic based on AMF 106 and SMF 108 providing (to the PCF) the same information indicating that the condition has been satisfied, among other examples.

While the foregoing example has been provided with respect to PCF 110 providing the common policy control request trigger to AMF 106 (e.g., via the AM policy control service), in some implementations, PCF 110 may provide the common policy control request trigger to SMF 108 (e.g., via the SM policy control service). For example, PCF 110 may provide the SM policy and the common policy control request trigger to SMF 108 (instead of PCF 110 providing the common policy control request trigger to AMF 106). In such implementations, RAN 104 may provide, to SMF 108, an indication of a PRA change associated with UE 102, in a manner similar to the manner described above in connection with FIG. 1C. Based on the indication of the PRA change and the common policy control request trigger, SMF 108 may provide the policy control update request to PCF 110 to cause PCF 110 to update the SM policy, in a manner similar to the manner described above in connection with FIG. 1C. Based on the policy control update request provided by SMF 108, PCF 110 may determine whether to update the SM policy and determine whether to update the AM policy and/or the UE policy, in a manner similar to the manner described above in connection with FIG. 1C. PCF 110 may provide the updated SM policy and may provide the updated AM policy and/or the updated UE policy, in a manner similar to the manner described above in connection with FIG. 1D.

As indicated above, FIGS. 1A-1D are provided as an example. Other examples may differ from what is described with regard to FIGS. 1A-1D. The number and arrangement of devices shown in FIGS. 1A-1D are provided as an example. In practice, there may be additional devices, fewer devices, different devices, or differently arranged devices than those shown in FIGS. 1A-1D. Furthermore, two or more devices shown in FIGS. 1A-1D may be implemented within a single device, or a single device shown in FIGS. 1A-1D may be implemented as multiple, distributed devices. Additionally, or alternatively, a set of devices (e.g., one or more devices) shown in FIGS. 1A-1D may perform one or more functions described as being performed by another set of devices shown in FIGS. 1A-1D.

Figure 2:
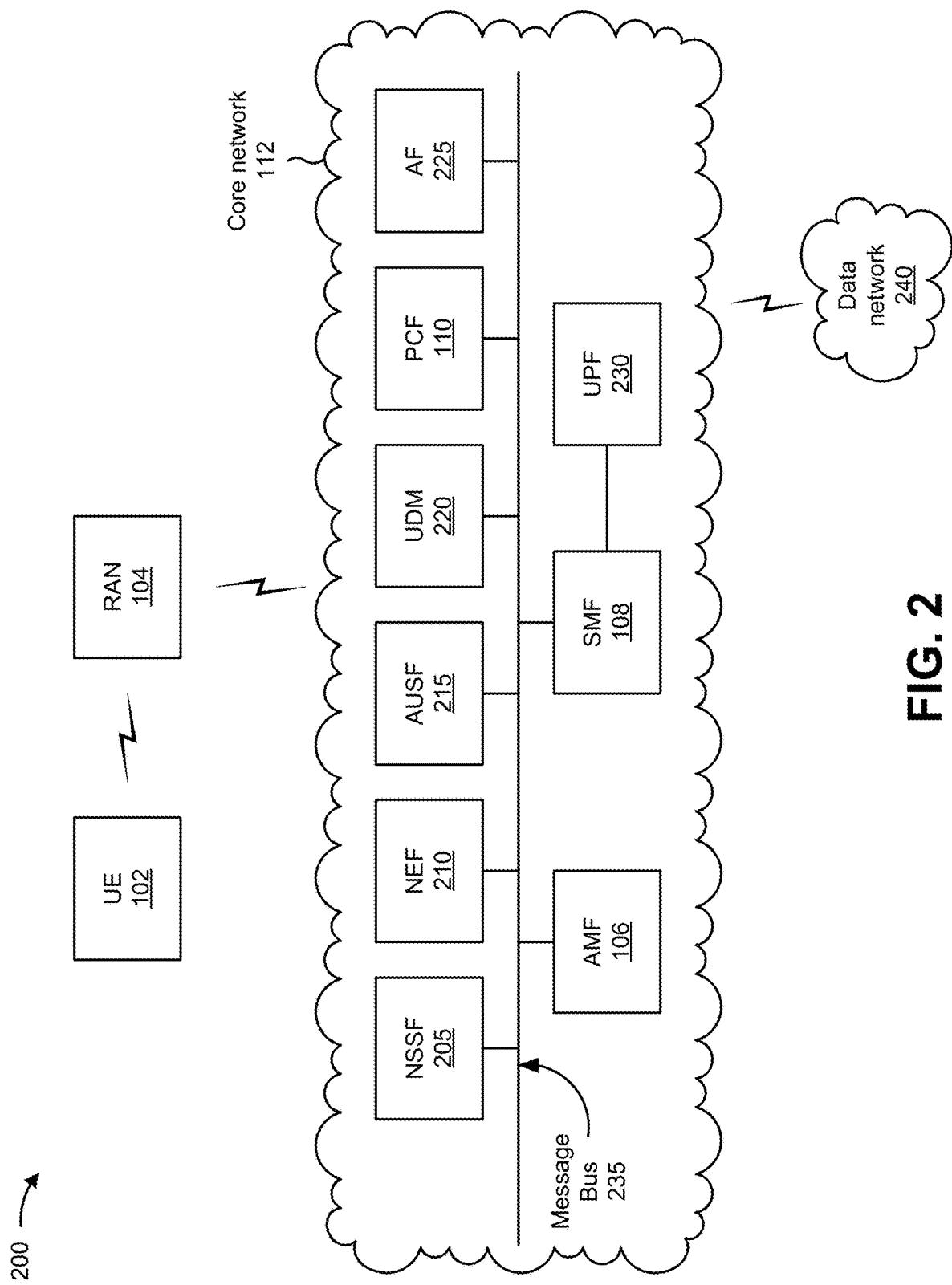
FIG. 2 is a diagram of an example environment in which systems and/or methods described herein may be implemented.

FIG. 2 is a diagram of an example environment 200 in which systems and/or methods described herein may be implemented. As shown in FIG. 2, example environment 200 may include UE 102, RAN 104, core network 112, and a data network 240. Devices and/or networks of example environment 200 may interconnect via wired connections, wireless connections, or a combination of wired and wireless connections.

UE 102 includes one or more devices capable of receiving, generating, storing, processing, and/or providing information, such as information described herein. For example, UE 102 can include a mobile phone (e.g., a smart phone or a radiotelephone), a laptop computer, a tablet computer, a desktop computer, a handheld computer, a gaming device, a wearable communication device (e.g., a smart watch or a pair of smart glasses), a mobile hotspot device, a fixed wireless access device, customer premises equipment, an autonomous vehicle, or a similar type of device.

RAN 104 may support, for example, a cellular RAT. RAN 104 may include one or more base stations (e.g., base transceiver stations, radio base stations, node Bs, eNodeBs (eNBs), gNodeBs (gNBs), base station subsystems, cellular sites, cellular towers, access points, transmit receive points (TRPs), radio access nodes, macrocell base stations, microcell base stations, picocell base stations, femtocell base stations, or similar types of devices) and other network entities that can support wireless communication for UE 102. RAN 104 may transfer traffic between UE 102 (e.g., using a cellular RAT), one or more base stations (e.g., using a wireless interface or a backhaul interface, such as a wired backhaul interface), and/or core network 112. RAN 104 may provide one or more cells that cover geographic areas.

In some implementations, RAN 104 may perform scheduling and/or resource management for UE 102 covered by RAN 104 (e.g., UE 102 covered by a cell provided by RAN 104). In some implementations, RAN 104 may be controlled or coordinated by a network controller, which may perform load balancing, network-level configuration, and/or other operations. The network controller may communicate with RAN 104 via a wireless or wireline backhaul. In some implementations, RAN 104 may include a network controller, a self-organizing network (SON) module or component, or a similar module or component. In other words, RAN 104 may perform network control, scheduling, and/or network management functions (e.g., for uplink, downlink, and/or sidelink communications of UE 102 covered by RAN 104).

In some implementations, core network 112 may include an example functional architecture in which systems and/or methods described herein may be implemented. For example, core network 112 may include an example architecture of a fifth generation (5G) next generation (NG) core network included in a 5G wireless telecommunications system. While the example architecture of core network 112 shown in FIG. 2 may be an example of a service-based architecture, in some implementations, core network 112 may be implemented as a reference-point architecture and/or a 4G core network, among other examples.

As shown in FIG. 2, core network 112 may include a number of functional elements. The functional elements may include, for example, a network slice selection function (NSSF) 205, a network exposure function (NEF) 210, an authentication server function (AUSF) 215, a unified data management (UDM) component 220, PCF 110, an application function (AF) 225, AMF 106, SMF 108, and/or a user plane function (UPF) 230. These functional elements may be communicatively connected via a message bus 235. Each of the functional elements shown in FIG. 2 is implemented on one or more devices associated with a wireless telecommunications system. In some implementations, one or more of the functional elements may be implemented on physical devices, such as an access point, a base station, and/or a gateway. In some implementations, one or more of the functional elements may be implemented on a computing device of a cloud computing environment.

NSSF 205 includes one or more devices that select network slice instances for UE 102. By providing network slicing, NSSF 205 allows an operator to deploy multiple substantially independent end-to-end networks potentially with the same infrastructure. In some implementations, each slice may be customized for different services.

NEF 210 includes one or more devices that support exposure of capabilities and/or events in the wireless telecommunications system to help other entities in the wireless telecommunications system discover network services.

AUSF 215 includes one or more devices that act as an authentication server and support the process of authenticating UE 102 in the wireless telecommunications system.

UDM 220 includes one or more devices that store user data and profiles in the wireless telecommunications system. UDM 220 may be used for fixed access and/or mobile access in core network 112.

PCF 110 includes one or more devices that provide a policy framework that incorporates network slicing, roaming, packet processing, and/or mobility management, among other examples.

AF 225 includes one or more devices that support application influence on traffic routing, access to NEF 210, and/or policy control, among other examples.

AMF 106 includes one or more devices that act as a termination point for non-access stratum (NAS) signaling and/or mobility management, among other examples.

SMF 108 includes one or more devices that support the establishment, modification, and release of communication sessions in the wireless telecommunications system. For example, SMF 108 may configure traffic steering policies at UPF 230 and/or may enforce user equipment IP address allocation and policies, among other examples.

UPF 230 includes one or more devices that serve as an anchor point for intraRAT and/or interRAT mobility. UPF 230 may apply rules to packets, such as rules pertaining to packet routing, traffic reporting, and/or handling user plane QoS, among other examples.

Message bus 235 represents a communication structure for communication among the functional elements. In other words, message bus 235 may permit communication between two or more functional elements.

Data network 240 includes one or more wired and/or wireless data networks. For example, data network 240 may include an IP Multimedia Subsystem (IMS), a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third party services network, an operator services network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of example environment 200 may perform one or more functions described as being performed by another set of devices of example environment 200.

Figure 3:
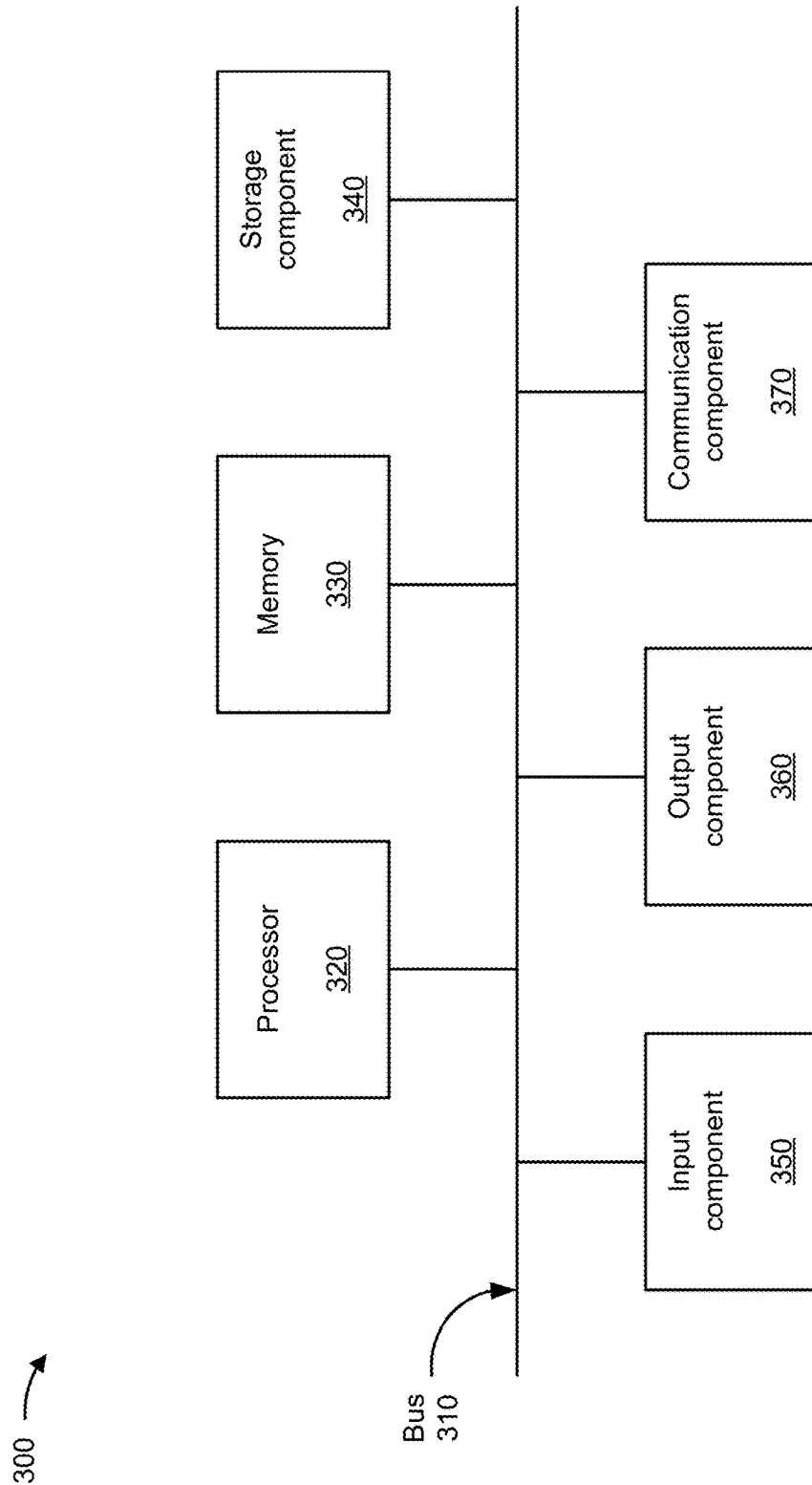
FIG. 3 is a diagram of example components of one or more devices of FIG. 2.

FIG. 3 is a diagram of example components of one or more devices in FIG. 2. The one or more devices may a device 300, which may correspond to UE 102, RAN 104, NEF 210, AUSF 215, UDM 220, PCF 110, AF 225, AMF 106, SMF 108, and/or UPF 230. In some implementations, UE 102, RAN 104, NEF 210, AUSF 215, UDM 220, PCF 110, AF 225, AMF 106, SMF 108, and/or UPF 230 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random-access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid-state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flowchart of an example process 400 for enabling optimized reporting of policy control request triggers. In some implementations, one or more process blocks of FIG. 4 may be performed by a first network device (e.g., PCF 110). In some implementations, one or more process blocks of FIG. 4 may be performed by another device or a group of devices separate from or including the first network device, such as an NSSF (e.g., NSSF 205), an NEF (e.g., NEF 210), an AUSF (e.g., AUSF 215), a UDM (e.g., UDM 220), an AF (e.g., AF 225), an AMF (e.g., AMF 106), an SMF (e.g., SMF 108), and/or a UPF (e.g., UPF 230). Additionally, or alternatively, one or more process blocks of FIG. 4 may be performed by one or more components of device 300, such as processor 320, memory 330, storage component 340, input component 350, output component 360, and/or communication component 370.

As shown in FIG. 4, process 400 may include receiving, from a second network device, a first policy control create request (block 410). For example, the first network device may receive, from a second network device, a first policy control create request, as described above. In some implementations, receiving the first policy control create request includes receiving the first policy control create request from the second network device based on the second network device authenticating the UE.

As further shown in FIG. 4, process 400 may include providing, to the second network device, a common policy control request trigger based on the first policy control create request (block 420). For example, the first network device may provide, to the second network device, a common policy control request trigger based on the first policy control create request, as described above. In some implementations, the common policy control request trigger is provided with one or more access and mobility policies.

In some implementations, process 400 includes causing, based on the common policy control request trigger, the second network device to register the UE with a network associated with the first network device, the second network device, and the third network device. In some implementations, the common policy control request trigger is associated with the UE policy, the network device policy, and a policy associated with the second network device.

As further shown in FIG. 4, process 400 may include receiving a second policy control create request associated with a UE (block 430). For example, the first network device may receive a second policy control create request associated with a UE, as described above.

As further shown in FIG. 4, process 400 may include causing a UE policy to be provided to the UE based on the second policy control create request (block 440). For example, the first network device may cause a UE policy to be provided to the UE based on the second policy control create request, as described above. A protocol data unit session may be created for the UE. The third policy control create request may be associated with the protocol data unit session created for the UE.

As further shown in FIG. 4, process 400 may include receiving, from a third network device, a third policy control create request (block 450). For example, the first network device may receive, from a third network device, a third policy control create request, as described above.

In some implementations, the first network device is a policy control function device, the second network device is an access and mobility management function device, and the third network device is a session management function device. In some implementations, the first network device is a policy control function device, the second network device is a session management function device, and the third network device is an access and mobility management function device. In some implementations, the first network device is a policy control function device that determines policies for the UE, the second network device, and the third network device As further shown in FIG. 4, process 400 may include providing a network device policy to the third network device based on the third policy control create request (block 460). For example, the first network device may provide a network device policy to the third network device based on the third policy control create request, as described above.

The network device policy includes one of a session management policy or an access and mobility management policy.

As further shown in FIG. 4, process 400 may include receiving, from the second network device, a policy control update request based on the common policy control request trigger (block 470). For example, the first network device may receive, from the second network device, a policy control update request based on the common policy control request trigger, as described above. The policy control update request includes one of a presence reporting area change associated with the UE or a location change associated with the UE As further shown in FIG. 4, process 400 may include determining whether to update the UE policy or the network device policy based on receiving the policy control update request (block 480). For example, the first network device may determine whether to update the UE policy or the network device policy based on receiving the policy control update request, as described above.

As further shown in FIG. 4, process 400 may include generating an updated UE policy or an updated network device policy based on determining whether to update the UE policy or the network device policy (block 490). For example, the first network device may generate an updated UE policy or an updated network device policy based on determining whether to update the UE policy or the network device policy, as described above.

implementations, process 400 includes determining whether to update a policy associated with the second network device based on receiving the policy control update request, generating an updated policy based on determining whether to update the policy associated with the second network device, and providing the updated policy to the second network device. In some implementations, process 400 may include one or more of causing the updated UE policy to be provided to the UE or providing the updated network device policy to the third network device.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   providing, by a first device, a first policy trigger based on a first request associated with a second device;
   causing, by the first device, a second policy to be provided based on a second request associated with a user device;
   providing, by the first device, a third policy to a third device based on a third request;
   receiving, by the first device and from the second device, a policy control update request based on the first policy trigger;
   determining, by the first device, whether to update the second policy or the third policy based on receiving the policy control update request; and
   generating, by the first device, an updated user equipment (UE) policy or an updated network device policy based on determining whether to update the second policy or the third policy.

2. The method of claim 1, wherein the first device is a policy control function device, the second device is an access and mobility management function device, and the third device is a session management function device.

3. The method of claim 1, further comprising:
providing the updated UE policy to the user device or the updated network device policy to the third device.

4. The method of claim 1, wherein the third request is associated with a protocol data unit session created for the user device.

5. The method of claim 1, wherein the first policy trigger is a common policy control request trigger.

6. The method of claim 1, wherein the first policy trigger is provided to the second device, and
wherein the second policy is provided to the user device.

7. The method of claim 1, wherein the policy control update request includes at least one of:
a presence reporting area change associated with the user device, or
a location change associated with the user device.

8. A non-transitory computer-readable medium storing a set of instructions, the set of instructions comprising:
one or more instructions that, when executed by one or more processors of a first device, cause the first device to:
provide a first policy trigger based on a first request associated with a second device;
cause a second policy to be provided based on a second request associated with a user device;
provide a third policy to a third device based on a third request;
receive, from the second device, a policy control update request based on the first policy trigger;
determine whether to update the second policy or the third policy based on receiving the policy control update request; and
generate an updated user equipment (UE) policy or an updated network device policy based on determining whether to update the second policy or the third policy.

9. The non-transitory computer-readable medium of claim 8, wherein the first device is a policy control function device, the second device is an access and mobility management function device, and the third device is a session management function device.

10. The non-transitory computer-readable medium of claim 8, wherein the one or more instructions further cause the first device to:
provide the updated UE policy to the user device or the updated network device policy to the third device.

11. The non-transitory computer-readable medium of claim 8, wherein the third request is associated with a protocol data unit session created for the user device.

12. The non-transitory computer-readable medium of claim 8, wherein the first policy trigger is a common policy control request trigger.

13. The non-transitory computer-readable medium of claim 8, wherein the first policy trigger is provided to the second device, and
wherein the second policy is provided to the user device.

14. The non-transitory computer-readable medium of claim 8, wherein the policy control update request includes at least one of:
a presence reporting area change associated with the user device, or
a location change associated with the user device.

15. A first device, comprising:
one or more processors configured to:
provide a first policy trigger based on a first request associated with a second device;
cause a second policy to be provided based on a second request associated with a user device;
provide a third policy to a third device based on a third request;
receive, from the second device, a policy control update request based on the first policy trigger;
determine whether to update the second policy or the third policy based on receiving the policy control update request; and
generate an updated user equipment (UE) policy or an updated network device policy based on determining whether to update the second policy or the third policy.

16. The first device of claim 15, wherein the device is a policy control function device, the second device is an access and mobility management function device, and the third device is a session management function device.

17. The first device of claim 15, wherein the one or more processors are further configured to:
provide the updated UE policy to the user device or the updated network device policy to the third device.

18. The first device of claim 15, wherein the third request is associated with a protocol data unit session created for the user device.

19. The first device of claim 15, wherein the first policy trigger is a common policy control request trigger.

20. The first device of claim 15, wherein the policy control update request includes at least one of:
a presence reporting area change associated with the user device, or
a location change associated with the user device.

* * * * *